United States Patent Office 3,336,397
Patented Aug. 15, 1967

3,336,397
COPOLYMERIC COMPOSITIONS FROM CHLORAL AND CYCLIC FORMALS
Heinz J. Dietrich, Bethany, Joseph V. Karabinos, Orange, and Maurice C. Raes, Branford, Conn., assignors to Olin Mathieson Chemical Corporation
No Drawing. Filed Oct. 29, 1965, Ser. No. 505,752
4 Claims. (Cl. 260—615)

This invention relates to novel copolymers of chloral and cyclic acetals and to processes for preparing the novel copolymers.

Chloral polymerizes readily under the influence of acid or basic catalysts. The polychloral contains 72% chlorine and is non-flammable. However, it is infusible and insoluble in all organic solvents and is thus of no commercial value.

It is an object of this invention to provide copolymers of chloral which are fusible, soluble and thus more amenable to commercial utilization. It is a further object of this invention to provide copolymers containing high percentages of the chloral moiety and high contents of chlorine to retain, so far as possible, the non-flammability of the polychlorals.

The hemiacetals of chloral are unstable and are not useful in this invention. In contrast, the acetals of chloral with monohydric alcohols are very stable but their preparation requires very drastic conditions, for example, the use of perchloric acid as catalyst. Copolymeric acetals do not result when these conditions are applied to mixtures of chloral and dihydric alcohols. The inclusion of formaldehyde in such reaction mixtures leads to copolymeric formals and acetals which, however are unstable.

Copolymers of chloral and formaldehyde or chloral and trioxane are also well known. However, they have the disadvantages that they are unstable to heat and acids and even decompose spontaneously at room temperatures. Their high instability is caused by an unzipping action on the molecule starting at the end of the chain.

In contrast, it has now surprisingly been discovered that copolymeric acetals of chloral are readily produced when chloral reacts with certain cyclic formals and that the resulting copolymers are stable, fusible, soluble, self-extinguishing and useful. Suitable cyclic formals for the purposes of this invention have the formula

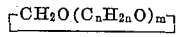

where $n$ is 2 to 6 inclusive and $m$ is 1 to 3 inclusive. Examples of readily available cyclic formals include 1,3-dioxolane, 1,3,6-trioxocane and 1,3-dioxepane.

The copolymeric acetals of this invention have the formula:

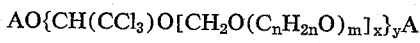

where A is hydrogen or acyl, $n$ is 2 to 6 inclusive, $m$ is 1 to 3 inclusive, $x$ is 1 to about 10 and $y$ is 2 to about 1000.

The copolymeric acetals of this invention which are formed by copolymerization of chloral with the cyclic formals have the formula given above where A is H. These copolymers of this invention have higher stability because every formaldehyde unit is adjacent to and is protected, by at least one alkylene oxide unit of 2 to 6 carbons, against the unzipping action of heat or acids. Still better protection against heat is provided by copolymeric acetals of this invention having the formula given above where A is acyl. These copolymers have no terminal hydroxyl group and are remarkably resistant to depolymerization. Suitable acyl groups are particularly acetyl and benzoyl and, more generally aliphatic acyl groups of 2 to 6 carbons and aryl acyl groups of 6 to 8 carbons but other acyl groups also confer additional stability.

The copolymerization process of this invention comprises reacting chloral with cyclic formals as defined above in the presence of an acid catalyst at temperatures from —78 to 25° C.

As acid catalyst in the process of this invention, a wide variety of acids are suitable. Protonic acids having a pK constant of 4 or less measured in water at 25° C. are suitable, including both inorganic and organic acids. Examples include perchloric acid, hydrochloric acid, sulfuric acid, phosphoric acid, hydrofluoric acid and p-toluenesulfonic acid.

Any of the Lewis type acids which are known to be active in Friedel-Crafts type reactions are suitable as catalysts in the practice of this invention. Suitable catalysts of this nature are listed, for example, by G. Olah in "Friedel-Crafts and Related Reactions," published by Interscience Publications, 1963–64. Included are $BF_3$ and its etherate, $AlCl_3$, $Al(C_2H_5)Cl_2$, $AlBr_3$, $FeCl_3$, $SnCl_4$, $TiCl_4$, $ZnCl_2$ and $ZnBr_2$. These Lewis acids are advantageously used in combination with co-catalysts, for example, $H_2O$, HCl, HF, HCOOH and $CH_3COOH$.

Heterogeneous acids including acidic clays, for example, fuller's earth and acidic ion exchange resins are also suitably employed in the process of this invention.

The proportion of catalyst suitably ranges from 0.0001 to 1% by weight based on the monomers.

Although the copolymerization process of this invention is preferably performed without solvents because the reaction is faster, inert solvents are suitably used when desired. Suitable inert solvents are particularly the hydrocarbons and halohydrocarbons, for example, petroleum ether, hexane, benzene and ethylene dichloride.

In the coplymerization process of this invention minor proportions of cyclic dimers and trimers are formed from chloral and the cyclic formals. Advantageously these low molecular by-products are extracted from the high molecular linear polymers or the latter are purified by dissolution and precipitation.

The copolymeric acetals of this invention contain from 10 to 50% chlorine and are self-extinguishing.

Molecular weights range from 440 to over 10,000. Softening points vary from below room temperature to 50° C.

EXAMPLE I

A mixture of 147 parts (1 mole) of chloral, containing 0.2% water and 74 parts (1 mole) of anhydrous 1,3-dioxolane was cooled to 5° C. in an ice bath. Then 0.28 parts of $BF_3$ etherate was added, maintaining a nitrogen atmosphere above the reaction mixture. After 24 hours a clear tacky gel was obtained, which was dissolved in dioxane, poured into water containing sodium bicarbonate and heated to neutralize the acid catalyst. After several washings with water, the polymer was reprecipitated twice in 400 ml. of a mixture of 5/1 petroleum ether (B.P. 30–60° C.)-acetone and once in 400 ml. of a 1.4/1 mixture of petroleum ether-acetone. The insoluble fraction was dried on a rotary evaporator for 3.5 hours at 80° C. and 12 mm. Hg. The molecular weight was 8,400, the chlorine content was 41.7% and the hydroxyl number was 8.3. Yield: 46.2%. The polymer was soft and non-tacky.

EXAMPLE II (A) *Copolymer preparation.*—A mixture of 147 parts (1 mole) of anhydrous chloral and 74 parts (1 mole) of anhydrous 1,3-dioxolane was cooled to 5° C. in an ice bath and 1.69 parts (0.094 mole) of water was added. Then 0.28 parts of $BF_3$ etherate was added, maintaining a nitrogen atmosphere above the reaction mixture. After 24 hours, a clear, tacky gel was obtained which was purified as described in Example I. The resulting copolymer was a viscous liquid having a molecular weight of 671 and a chlorine content of 39%.

(B) *Film preparation.*—The copolymer prepared as described in Example II (A) was used with tolylene diisocyanate to form a tough, extrudable film. A mixture of 6.7 parts of the copolymer, 1.7 parts of tolylene diisocyanate and 0.1 part of triethylamine in 10 parts of tetrahydrofuran was heated at 70° C. for 4 hours. The solution was cast on a glass plate, the solvent was evaporated in vacuum and the film was further heated at 80° C. for 2 hours. A tough, extrudable film was obtained which was partly soluble in common organic solvents.

EXAMPLE III (A) *Copolymer preparation.*—A mixture of 147 g. (1 mole) of anhydrous chloral and 74 g. (1 mole) of anhydrous 1,3-dioxolane was cooled to 5° C. in an ice bath and 3.30 parts (0.18 mole) of water was added. Then 0.05 ml. of etherate was added, maintaining a nitrogen atmosphere above the reaction mixture. The copolymer was extracted 3 times with 400 ml. of petroleum ether (B.P. 30–60° C.) and then vacuum dried at 80° C. and 12 mm. Hg to remove the petroleum ether. The resulting copolymer had a molecular weight of 1040 and a hydroxyl number of 92.9 mg. KOH per gram.

(B) *Acetylated copolymer preparation.*—A mixture of 20 g. of the copolymer prepared as described in Example III (A) was dissolved in 140 g. of acetic anhydride and 35 g. of pyridine. The solution was heated to 133° C. for 15 minutes, cooled and the copolymer was precipitated by pouring the reaction mixture into water. The mixture was neutralized with NaHCO₃, the water layer was decanted and the copolymer was purified by precipitation from acetone solution by adding petroleum ether. 15 g. of acetylated copolymer was obtained, molecular weight 1285.

(C) *Film preparation.*—A mixture of 30 percent by weight of the acetylated copolymer prepared as described in Example III (B) and 70 percent of cellulose acetate was dissolved in acetone to form a 10% solution. A film was cast on glass and dried at 70° C. The film was clear, strong and more flexible than a similar film of cellulose acetate alone.

EXAMPLE IV (A) *Copolymer preparation.*—A mixture of 29.4 grams (0.2 mole) of anhydrous chloral and 23.6 grams (0.20 mole) of anhydrous 1,3,6-trioxocane was cooled to 5° C. in an ice bath. Then 0.05 ml. of BF₃ etherate was added, maintaining a nitrogen atmosphere above the reaction mixture. After 24 hours, a clear, tacky gel was obtained which was purified as described in Example I. The resulting copolymer was a tacky solid having a molecular weight of 2840, a chlorine content of 34% and a hydroxyl number of 30.4 mg. KOH per gram. Yield: 81%.

(B) *Stability of copolymer.*—The copolymer prepared as described in Example IV (A) showed a weight loss of 0.10%/min. over a period of 3 hours at 150° C. A copolymer made as described in Example I, showed a heat loss of 0.22%/min. A copolymer made as described in Example I but using an equimolar mixture of chloral and trioxane showed a heat loss of 0.30%/min. The trioxane copolymer was not protected against unzipping but the copolymers of this invention were effectively protected against unzipping by one or more ethylene oxide units adjacent to the methylene oxide units.

(C) *Film preparation.*—The copolymer prepared as described in Example IV (A) was used with tolylene diisocyanate to form a tough, extrudable film. A mixture of 8.4 grams of the copolymer, 1.56 grams of tolylene diisocyanate and 0.1 part of triethylamine in 10 parts of tetrahydrofuran was heated at 70° C. for 7 hours. The solution was cast on a glass plate, the solvent was evaporated in vacuum and the film was further heated at 80° C. for 2 hours. A tough, flexible film was obtained which was partly soluble in common organic solvents. It contained 29 percent of chlorine and was slow burning.

EXAMPLE V

A mixture of 58 grams (0.4 mole) of chloral and 23.6 grams (0.20 mole) of 1,3,6-trioxocane was cooled to 5° C. in an ice bath. The chloral contained 100 p.p.m. of water and the 1,3,6-trioxocane about 10 to 20 p.p.m. Then 0.076 ml. of BF₃ etherate was added, maintaining a nitrogen atmosphere above the reaction mixture. After 24 hours, a clear, tacky gel was obtained which was purified as described in Example I. The resulting copolymer was a tacky solid having a molecular weight of 3040 and a chlorine content of 39.5%. Yield: 62%.

EXAMPLE VI

A mixture of 147 g. (1 mole) of chloral, containing 0.2% water and 74 g. (1 mole) of anhydrous 1,3-dioxolane was cooled to 5° C. in an ice bath. Then 1.65 ml. of water and 0.05 ml. of concentrated H₂SO₄ was added, maintaining a nitrogen atmosphere above the reaction mixture. After 11 weeks a clear, tacky gel was obtained, which was dissolved in dioxane, poured into water containing sodium bicarbonate and heated to neutralize the acid catalyst. After several washings with water the polymer was reprecipitated in petroleum ether and the insoluble fraction dried in vacuum. The molecular weight of the polymer was 1220, the chlorine content was 42.0% and the hydroxyl number was 58 mg. KOH/g.

EXAMPLE VII

A mixture of 147 parts (1 mole) of chloral, containing 0.2% water and 74 parts (1 mole) of anhydrous 1,3-dioxolane was cooled to −28° C. Then 0.28 part of BF₃ etherate was added, maintaining a nitrogen atmosphere above the reaction mixture. After 6 weeks a clear, tacky gel was obtained, which was dissolved in dioxane, poured into water containing sodium bicarbonate and heated to neutralize the acid catalyst. After several washings with water the polymer was reprecipitated in methanol and the insoluble fraction dried in vacuum. The molecular weight of the polymer was 1260, the chlorine content was 41% and the hydroxyl number was 13.7 mg. KOH/g.

EXAMPLE VIII

A mixture of 147 g. (1 mole) of chloral, containing 650 p.p.m. of water, 74 g. (1 mole) of 1,3-dioxolane and 0.01 ml. of SbCl₅ stood 20 days at 5° C. The resulting polymer was washed with water and precipitated twice in 500 ml. of petroleum ether (B.P. 30–60° C.) The insoluble fraction had a molecular weight of 6300. Yield: 44.0%.

EXAMPLE IX

The procedure of Example I was repeated using 73 g. (0.5 mole) of chloral and 74 g. (1 mole) of 1,3-dioxolane. The resulting copolymer had a molecular weight of 4980, contained 32.6% Cl and had a hydroxyl number of 9.1 mg. KOH/g. It was a sticky solid. Yield: 57.5%.

EXAMPLE X

A mixture of 14.7 g. (0.1 mole) of chloral, 65.7 g. (0.9 mole) of 1,3-dioxolane and 0.28 ml. of BF₃ etherate stood at 5° C. for 40 days. The copolymer formed was separated, washed and precipitated as described in Example I. It had a molecular weight of 3000, contained about 13% chlorine and was partly soluble but easily dispersible in water.

What is claimed is:

1. Copolymers having the formula $$AO\{CH(CCl_3)O[CH_2O(C_nH_{2n}O)_m]_x\}_yA$$

where A is hydrogen or acyl said acyl selected from the group consisting of alkanoyl of 2 to 6 carbons and aroyl of 6 to 8 carbons, $n$ is 2 to 6 inclusive, $m$ is 1 to 3 inclusive, $x$ is 1 to 10 and $y$ is 2 to 1000.

2. Copolymers as claimed in claim 1 where $x$ is 1 to 5 and $y$ is 2 to 100.

3. Copolymers as claimed in claim 2 where A is hydrogen and $m$ is 1.

4. Copolymers as claimed in claim 1 where acyl is acetyl or benzoyl.

No references cited.

LEON ZITVER, *Primary Examiner.*

H. T. MARS, *Assistant Examiner.*